(12) United States Patent
Nurmela et al.

(10) Patent No.: US 7,422,145 B2
(45) Date of Patent: Sep. 9, 2008

(54) MOBILE COMMUNICATION TERMINAL AND METHOD

(75) Inventors: Marja-Leena Nurmela, Routio (FI); Heini Tuorila, Oulu (FI); Dominick Reed, Brinkley (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/430,265

(22) Filed: May 8, 2006

(65) Prior Publication Data

US 2007/0257097 A1 Nov. 8, 2007

(51) Int. Cl.
*G06K 19/05* (2006.01)
*G06F 17/00* (2006.01)

(52) U.S. Cl. ..................... 235/375; 235/492

(58) Field of Classification Search ........... 235/492, 235/495, 375, 462.45, 472; 600/513; 455/405, 455/575.1; 345/173, 156, 179; 482/910, 482/8, 1
See application file for complete search history.

(56) References Cited

U.S. PATENT DOCUMENTS

| | | | |
|---|---|---|---|
| 6,282,441 B1 * | 8/2001 | Raymond et al. ........... 600/513 |
| 6,716,139 B1 * | 4/2004 | Hosseinzadeh-Dolkhani et al. ........... 482/1 |
| 2004/0169674 A1 * | 9/2004 | Linjama ............ 345/702 |
| 2005/0209050 A1 * | 9/2005 | Bartels ............ 482/8 |

OTHER PUBLICATIONS

MessagePad 2000 User's Manual, Copyright 1997 by Apple Computer, Inc. Relevant pages: Cover and copyright information pages, 116, 147-148, 201-202, 251, and Preface p. xii.*

* cited by examiner

*Primary Examiner*—Daniel St. Cyr
(74) *Attorney, Agent, or Firm*—Perman & Green, LLP

(57) ABSTRACT

A method for providing a user interface of a mobile communication terminal having a tap sensitive sensor and a display. The method may include: detecting a first tap in a first direction of the mobile terminal using the tap sensitive sensor; determining a first user input, utilizing the first tap in the first direction; and as a response to the first user input, executing a first set of software code corresponding to the first user input and serving to control at least one display related aspect of the mobile communication terminal. Corresponding mobile communication terminals and computer program product are also presented.

24 Claims, 4 Drawing Sheets

MOBILE COMMUNICATION TERMINAL AND METHOD

FIELD OF THE INVENTION

The aspect of the invention generally relates to mobile terminals and more particularly to user input of mobile terminals.

BACKGROUND OF THE INVENTION

Mobile terminals, or mobile (cellular) telephones, for mobile telecommunications systems like GSM, UMTS, D-AMPS and CDMA2000 have been used for many years now. In the older days, mobile terminals were used almost exclusively for voice communication with other mobile terminals or stationary telephones. More recently, the use of modern terminals has been broadened to include not just voice communication, but also various other services and applications such as www/wap browsing, video telephony, electronic messaging (e.g. SMS, MMS, email, instant messaging), digital image or video recording, FM radio, music playback, exercise analysis, electronic games, calendar/organizer/time planner, word processing, etc. Furthermore, the modern terminals have local connectivity abilities, such as Bluetooth, allowing the mobile terminals to communicate with a wide array of devices.

Being mobile, the mobile terminals are naturally often used while the user is moving. When in movement, it requires close attention by the user to provide user input to the mobile terminal.

In the prior art, one attempt to simplify user interaction while in movement is to allow the user to control the mobile terminal with voice control. In this way, the user can speak commands into a microphone of the mobile terminal to control the mobile terminal. While this solution somewhat alleviates user interaction while mobile, it can be awkward to speak commands into a mobile phone, e.g. when using public transport. Additionally, it can sometimes be difficult for the mobile terminal to distinguish between the allowable commands, particularly if several users share usage of one terminal.

Consequently, there is a need to provide a mobile communication terminal and method providing a user interface which is easier to use while the user is mobile.

SUMMARY OF THE INVENTION

In view of the above, an objective of the invention is to solve or at least reduce the problems discussed above.

Generally, the above objectives are achieved by the attached independent patent claims.

According to a first aspect of the invention there has been provided a method for providing a user interface of a mobile communication terminal comprising a tap sensitive sensor and a display, the method comprising: detecting a first tap in a first direction of the mobile terminal using the tap sensitive sensor; determining a first user input, utilizing the first tap in the first direction; and as a response to the first user input, executing a first set of software code corresponding to the first user input and serving to control at least one display related aspect of the mobile communication terminal.

The first set of software code may comprise code for illuminating the display.

The first set of software code may comprise code for rendering a first exercise related measurement on the display.

The first set of software code may comprise code for generating synthetic voice sounds at least in part corresponding to at least part of data of the display.

The at least part of data of the display may correspond to text of a message received by the mobile communication terminal.

The message may be a message selected from the group comprising a short message, a multimedia message, an e-mail message and an instant message.

The first user input may be used by an exercise application.

The first direction may be a direction being, within a margin of error from, a direction directed perpendicularly towards the display.

The method may further comprise: detecting a second tap in the first direction of the mobile terminal using the tap sensitive sensor; determining a second user input, utilizing the second tap in the first direction; and as a response to the second user input, executing a second set of software code corresponding to the second user input.

The second set of software code may comprise code for rendering a second exercise related measurement on the display.

The method may further comprise: when a threshold time has passed without user input, executing software code for putting the mobile communication terminal in an idle state.

The software code for putting the mobile communication terminal in an idle state may comprise code for switching off illumination of the display.

A second aspect of the invention is a mobile communication terminal comprising a controller and a tap sensitive sensor, wherein: the controller is configured to detect a first tap in a first direction of the mobile terminal using the tap sensitive sensor; the controller is configured to determine a first user input, utilizing the first tap in the first direction; and the controller is configured to, as a response to the first user input, execute a first set of software code corresponding to the first user input and serving to control at least one display related aspect of the mobile communication terminal.

The tap sensitive sensor may comprise a motion sensor.

The tap sensitive sensor may comprise an accelerometer.

A third aspect of the invention is a mobile communication terminal comprising: a controller; a tap sensitive sensor; means for detecting a first tap in a first direction of the mobile terminal using the tap sensitive sensor; means for determining a first user input, utilizing the first tap in the first direction; and means for as a response to the first user input, executing a first set of software code corresponding to the first user input and serving to control at least one display related aspect of the mobile communication terminal.

A fourth aspect of the invention is a computer program product comprising software instructions that, when executed in a mobile communication terminal, performs the method according to the first aspect.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the invention will now be described in more detail, reference being made to the enclosed drawings, in which:

FIG. 2b is a schematic side view illustrating the mobile terminal in FIG. 2a.

FIG. 5 is a side view of the mobile terminal of FIG. 2a.

DETAILED DESCRIPTION OF THE INVENTION

The aspects of the invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
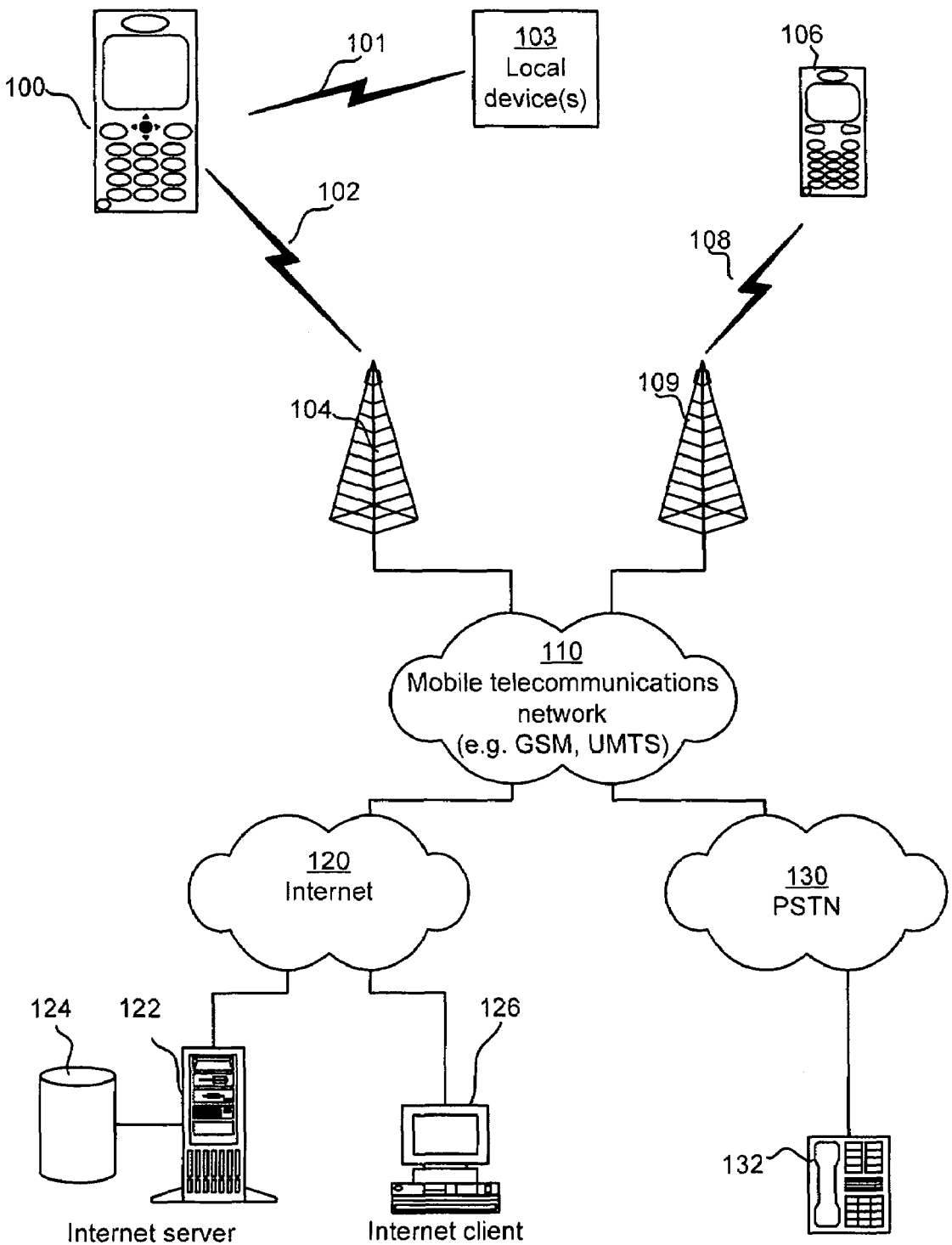
FIG. 1 is a schematic illustration of a cellular telecommunication system, as an example of an environment in which the aspect of the invention may be applied.

FIG. 1 illustrates an example of a cellular telecommunications system in which the invention may be applied. In the telecommunication system of FIG. 1, various telecommunications services such as cellular voice calls, www/wap browsing, cellular video calls, data calls, facsimile transmissions, music transmissions, still image transmissions, video transmissions, electronic message transmissions and electronic commerce may be performed between a mobile terminal 100 according to the present invention and other devices, such as another mobile terminal 106 or a stationary telephone 132. It is to be noted that for different embodiments of the mobile terminal 100 and in different situations, different ones of the telecommunications services referred to above may or may not be available; the invention is not limited to any particular set of services in this respect.

The mobile terminals 100, 106 are connected to a mobile telecommunications network 110 through RF links 102, 108 via base stations 104, 109. The mobile telecommunications network 110 may be in compliance with any commercially available mobile telecommunications standard, such as GSM, UMTS, D-AMPS, CDMA2000, FOMA and TD-SCDMA.

The mobile telecommunications network 110 is operatively connected to a wide area network 120, which may be Internet or a part thereof. An Internet server 122 has a data storage 124 and is connected to the wide area network 120, as is an Internet client computer 126. The server 122 may host a www/wap server capable of serving www/wap content to the mobile terminal 100.

A public switched telephone network (PSTN) 130 is connected to the mobile telecommunications network 110 in a familiar manner. Various telephone terminals, including the stationary telephone 132, are connected to the PSTN 130.

The mobile terminal 100 is also capable of communicating locally via a local link 101 to one or more local devices 103. The local link can be any type of link with a limited range, such as Bluetooth, a Universal Serial Bus (USB) link, a Wireless Universal Serial Bus (WUSB) link, an IEEE 802.11 wireless local area network link, an RS-232 serial link, etc. The local devices 103 can for example be various sensors that can communicate measurement values to the mobile terminal 100 over the local link 101.

Figure 2A:
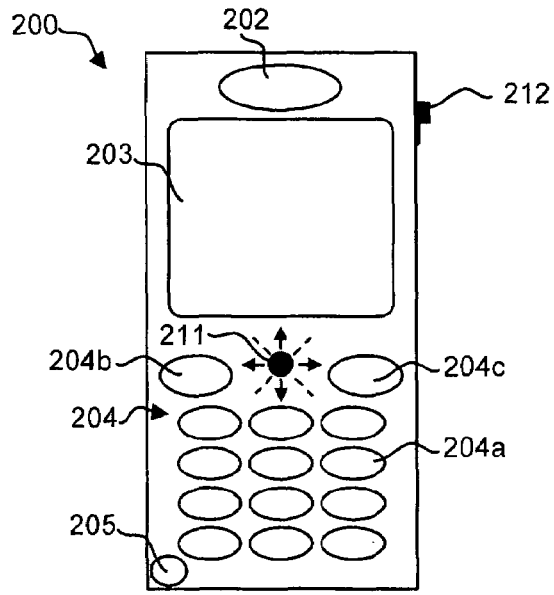
FIG. 2a is a schematic front view illustrating a mobile terminal according to an embodiment of the invention.

An embodiment 200 of the mobile terminal 100 is illustrated in more detail in FIG. 2a. The mobile terminal 200 comprises a speaker or earphone 202, a microphone 205, a display 203 and a set of keys 204 which may include a keypad 204a of common ITU-T type (alpha-numerical keypad representing characters "0"-"9", "*" and "#") and certain other keys such as soft keys 204b, 204c and a joystick 211 or other type of navigational input device.

Figure 2B:
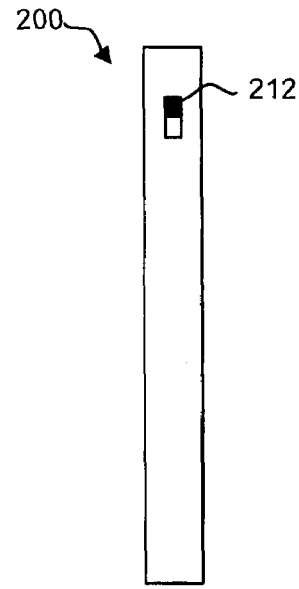

A mode switch button 212 is also provided, as can be seen more clearly in FIG. 2b. The button is used to switch an operating mode of the mobile terminal. In this embodiment, the button is by default positioned in an upper position. When the user wants to switch modes, the button is moved to a lower position and released, after which the button returns to the default upper position by mechanical means, such as a spring or similar. As the man skilled in the art will realize, the functionality of the mode switch button could easily be replaced with a push button or any other suitable type of input device.

Figure 3:
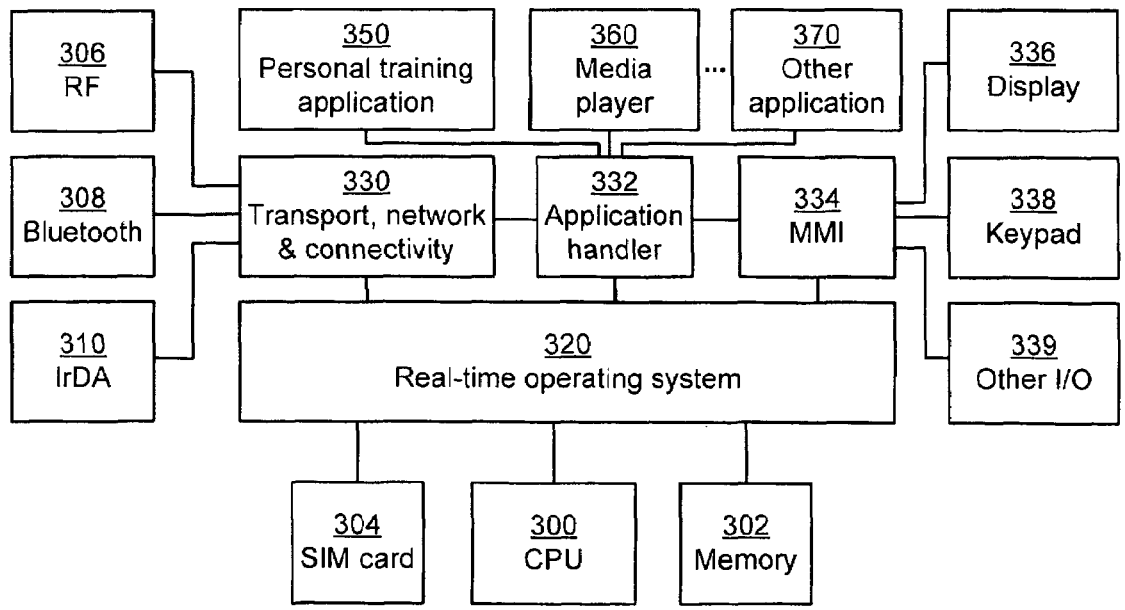
FIG. 3 is a schematic block diagram representing an internal component, software and protocol structure of the mobile terminal shown in FIGS. 2a and 2b.

The internal component, software and protocol structure of the mobile terminal 200 will now be described with reference to FIG. 3. The mobile terminal has a controller 300 which is responsible for the overall operation of the mobile terminal and is preferably implemented by any commercially available CPU ("Central Processing Unit"), DSP ("Digital Signal Processor") or any other electronic programmable logic device. The controller 300 has associated electronic memory 302 such as RAM memory, ROM memory, EEPROM memory, flash memory, or any combination thereof. The memory 302 is used for various purposes by the controller 300, one of them being for storing data and program instructions for various software in the mobile terminal. The software includes a real-time operating system 320, drivers for a man-machine interface (MMI) 334, an application handler 332 as well as various applications. The applications can include a personal exercise application 350, a media player application 360, as well as various other applications 370, such as applications for voice calling, video calling, sending and receiving SMS, MMS or email, web browsing, an instant messaging application, a phone book application, a calendar application, a control panel application, a camera application, one or more video games, a notepad application, etc.

The MMI 334 also includes one or more hardware controllers, which together with the MMI drivers co-operate with the display 336/203, keypad 338/204 as well as various other I/O devices such as microphone, speaker, vibrator, ringtone generator, LED indicator, etc. As is commonly known, the user may operate the mobile terminal through the man-machine interface thus formed.

The software also includes various modules, protocol stacks, drivers, etc., which are commonly designated as 330 and which provide communication services (such as transport, network and connectivity) for an RF interface 306, and optionally a Bluetooth interface 308 and/or an IrDA interface 310 for local connectivity. The RF interface 306 comprises an internal or external antenna as well as appropriate radio circuitry for establishing and maintaining a wireless link to a base station (e.g. the link 102 and base station 104 in FIG. 1).

As is well known to a man skilled in the art, the radio circuitry comprises a series of analogue and digital electronic components, together forming a radio receiver and transmitter. These components include, i.a., band pass filters, amplifiers, mixers, local oscillators, low pass filters, AD/DA converters, etc.

The mobile terminal also has a SIM card 304 and an associated reader. As is commonly known, the SIM card 304 comprises a processor as well as local work and data memory.

Figure 4:
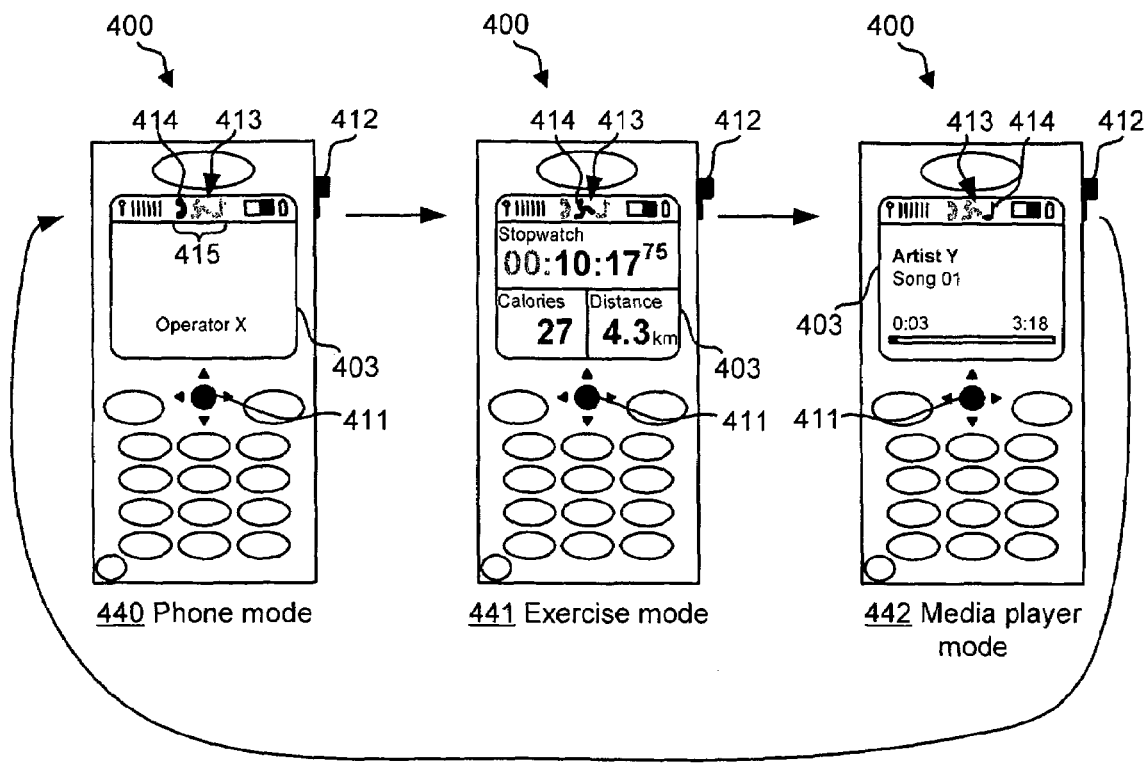
FIG. 4 is a schematic diagram showing how operational modes can be switched in an embodiment of the invention.

FIG. 4 shows how operational modes can be switched in an embodiment of the present invention. The mobile terminal 400, such as mobile terminal 200 of FIG. 2*a*, comprises a display 403, such as display 203 of FIG. 2*a*, a joystick 411, such as joystick 211 of FIG. 2*a*, and a mode switch button 412 such as mode switch button 212 of FIG. 2*a* to allow the user to switch operational modes.

Operational modes are modes where the mobile terminal 400 behaves in a specific way. For example, FIG. 4 shows 3 operational modes: a phone mode 440, an exercise mode 441 and a media player mode 442.

When the mobile terminal 400 is in the phone mode 440, the mobile terminal behaves as a user would expect a regular mobile terminal to behave. In other words, a menu system and/or shortcuts allow the user to instruct the mobile terminal to perform a desired function, such as voice telephony, www/wap browsing, video telephony, electronic messaging (e.g. SMS, MMS, email, instant messaging), digital image or video recording, electronic games, calendar/organizer/time planner, word processing, etc.

When the mobile terminal 400 is in the exercise mode 441, the main purpose of the mobile terminal is to provide the user with applications related to the physical exercise of the user.

In one embodiment, an accelerometer is integrated in the mobile terminal 400. In another embodiment, an external accelerometer is connected to the mobile terminal 400, e.g. over a local link, such as the local link 101 in FIG. 1. The accelerometer can detect acceleration and thereby steps that the user takes while the mobile terminal is carried by the user. When an accelerometer is integrated or connected to the mobile terminal 400, the mobile terminal automatically measures movement during the day. If the user previously has entered personal information, such as weight, height, etc., the mobile terminal 400 can convert the data from the accelerometer to other measurements, such as covered distance and burnt calories. Optionally, a GPS (Global Positioning System) sensor can be either integrated in, or connected to, the mobile terminal 400 to allow accurate distance measurement. Also, an external heart beat monitor can be connected to the mobile terminal 400 to detect heart beats and calculate heart rate.

When the mobile terminal 400 is in the media player mode 442, the main purpose of the mobile terminal is to play media to the user. For example, the media player can play music or sound files, such as MP3 (mpeg-1 audio layer 3) files, AAC (advanced audio coding) files or ogg files. Optionally, the media player can also be used to listen to FM (frequency modulated) radio, or to play video files according to standards such as MPEG-2, MPEG-4 or H.323.

As the user switches operational modes with mode switch button 412, the modes are switched serially. In the illustrated embodiment, there is a list of operational modes consisting of the phone mode 440, the exercise mode 441, and the media player mode 442, in that order. Consequently, if the mobile terminal 400 is in the phone mode 440 and the user actuates the mode switch button 412, the phone switches to the exercise mode 441. Similarly, if the mobile terminal 400 is in the exercise mode 441 and the user actuates the mode switch button 412, the phone switches to the media player mode 442. Finally, if the mobile terminal 400 is in the media player mode 443 and the user actuates the mode switch button 412, the phone loops back and switches to the phone mode 440.

To allow the user to easily determine what mode is currently used, elements of the user interface are specific for each mode. There are a multitude of distinguishing user interface elements that can vary to allow the user to see what mode is currently active, e.g., a centrally located light by the joystick 411 can change color, the background on the display 403 can have different colors or appearances, or the entire theme of the user interface with colors and fonts can change. In one embodiment, one icon 414 of a set of icons 415 at the top of the display 403 is highlighted to indicate which mode is active.

Mode changes can also change sound effects. For example in phone mode 440, the sounds may be discrete or even absent for actions such as button press, enter menu, exit menu, while in exercise mode 441, distinct and loud sounds are played for these actions to give clear feedback to the user while exercising. The media player mode 441 may have a totally different, more cool or ambient sound scheme on the actions mentioned in order to give feedback to the user on actions performed, while still not excessively disturbing the experience of listening to music. Optionally, the sound scheme can furthermore vary depending on whether headphones are connected to the mobile terminal 400 or not. The changes of sounds does not need to be totally different sounds; the changes could be effects applied to sounds. For example, a sound for a button press in phone mode could be reused in the media player mode, with a strong reverberation effect on it to give a more ambient effect while still providing familiarity to the user.

Additionally, a temporary user indication can be given when the actual mode change occurs. For example, the vibrator may vibrate on a mode change, where the vibration is either always identical for all modes or every mode has a particular vibration associated with it. Additionally, a dialog can show the name of the new operational mode in the display 403, or a sound effect or speech synthesizer pronouncing the new mode can be played to the user.

It is to be noted that although the modes can be switched certain appropriate processing of an inactive mode can still be performed. For example, the exercise application can count the steps of the user in the background, regardless of what mode the mobile terminal is in. Similarly, the media player can let the user hear an FM radio station while the mobile terminal is in exercise mode, or the phone application can temporarily interrupt current processing if there an incoming phone call is detected.

Figure 5:
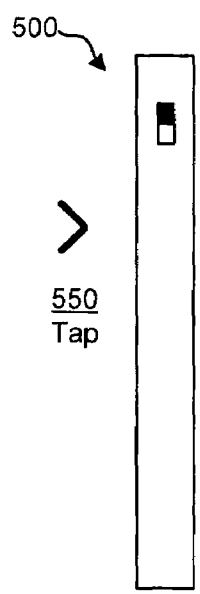

FIG. 5 is a side view of the mobile terminal of FIG. 2*a*. It is here shown how tapping can be used to control certain display related aspects of the mobile terminal.

Tapping is performed by the user simply giving a tap 550 with his/her fingers, hand or pointing tool (e.g. pen or stylus) on the front face, e.g. the display, of the mobile terminal 500. The tapping is detected by a motion sensor, such as an accelerometer, integrated or attached to the mobile terminal 500. The motion sensor can be the accelerometer described above in conjunction with FIG. 4. The motion sensor generates a signal when the mobile terminal 500 is tapped which is analyzed by the controller in the mobile terminal 500, such as controller 300 of FIG. 3, to distinguish a tap on the front face of the mobile terminal 500. The tap does not need to be straight from the front; it can be slightly from the left, right, up or down, as long as it has a component towards the front face of the mobile terminal 500. Accordingly, it is possible to provide a relatively large margin of error from a straight tap on the display. It is to be noted that the motion sensor can have a separate controller, integrated or connected, to distinguish a tap from other motions, whereby only a signal representing that a tap has occurred is communicated to the main controller 300.

It is to be noted that even though only one direction is shown here to provide user input, any number of distinguishable directions can be used. Specifically, taps in two directions for all three dimensions can be utilized to serve as an input.

While it is presented here that single-tapping provides user input, double-tapping can equally well be utilized.

Figure 6:
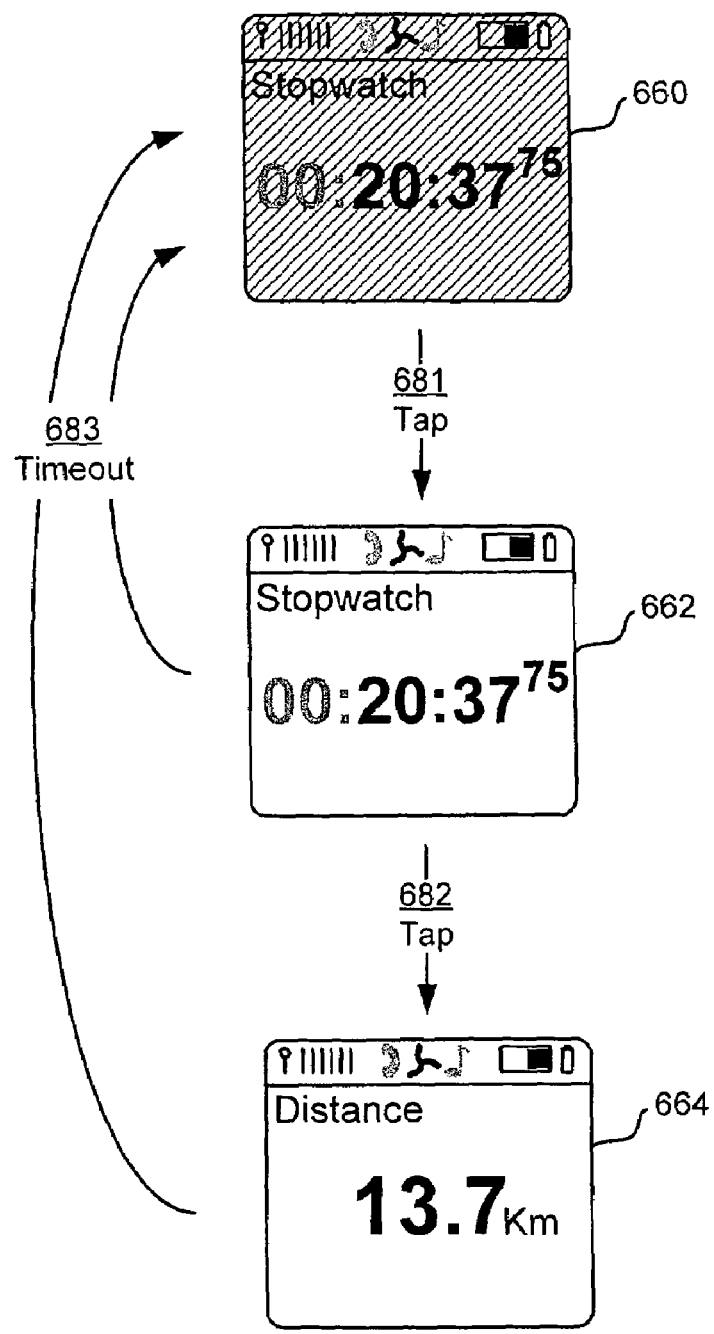
FIG. 6 is a schematic diagram showing how tapping is used to control exercise applications in the mobile terminal of FIG. 5.

FIG. 6 is a schematic diagram showing how tapping is used to control an exercise application, such as personal exercise application 350.

Initially, the mobile terminal has backlight switched off, and a screen such as an idle screen 660 is displayed. When the user taps 681 the front face of the mobile terminal, such as explained in conjunction with FIG. 5 above, the display shifts to show a first screen 662. Now the backlight is turned on so the user can read what is on the screen. Alternatively or additionally, a voice synthesizer can read out what is on the screen, i.e. "time, twenty minutes, thirty seven seconds". In this situation, there is little point for the voice synthesizer to read out the 100ths of seconds, so that information is omitted.

If the user taps 682 again, the display shifts to a second screen 664 and optionally reads out a measurement of this second screen. In this example, the second screen shows distance and the voice synthesizer could read "distance, thirteen point seven kilometers". When the user taps even one more time, the display could either shift back to the idle screen 660 or back to the first screen 662. If the voice synthesizer is used, the sound output can be directed to a speaker of the mobile terminal, a headset connected to the mobile terminal, or both.

If no input (using keys or tapping) is detected for a specific amount of time, a time-out 683 triggers the mobile terminal to again show the idle screen 660 and turn off the backlight to save energy.

While it is here shown a stopwatch measurement for the first screen 662 and a distance measurement for the second screen, any type of measurement can be configured to be shown on the first and the second screens. For example, another user may choose to show the number of burned calories on the first screen and speed on the second screen. Any combination of useful measurements can be done. Some non-limiting examples, including the previously mentioned measurements, are: distance, time, calories, speed, steps, step intensity (frequency), minutes per km, minutes per mile.

It is also to be noted that although the described embodiment shows two screens 662, 664, any desired number of screens can be used.

The tapping can also be used to control the mobile terminal to read out a received message. For example, when the mobile terminal is in exercise mode, a short message service (SMS) message arrives. An audible signal is presented, alerting the user that the message has arrived. The user taps the display, as described above, whereby the voice synthesizer in the mobile terminal reads out the message to the speaker or to a headset connected to the mobile terminal. Optionally, tapping is only accepted as an input to read out the message for a specific time period after the message has arrived. It is to be noted that this functionality can be used with any type of message, including multimedia message service (MMS) messages, instant messages (IM) and e-mail messages.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for providing a user interface of a mobile communication terminal comprising a tap sensitive sensor and a display, said method comprising:
    detecting a first tap in a first direction of said mobile terminal using said tap sensitive sensor;
    determining a first user input, utilizing said first tap in said first direction, wherein said first direction is, within a margin of error, perpendicular to said display;
    as a response to said first user input, executing a first set of software code corresponding to said first user input and serving to control at least one display related aspect of said mobile communication terminal; and
    wherein said first set of software code comprises code for illuminating said display.

2. The method according to claim 1, wherein said first set of software code comprises code for rendering a first exercise related measurement on said display.

3. The method according to claim 1, wherein said first set of software code comprises code for generating synthetic voice sounds at least in part corresponding to at least part of data of said display.

4. The method according to claim 1, wherein said at least part of data of said display corresponds to text of a message received by said mobile communication terminal.

5. The method according to claim 4, wherein said message is a message selected from the group consisting of a short message, a multimedia message, an e-mail message and an instant message.

6. The method according to claim 1, wherein said first user input is used by an exercise application.

7. The method according to claim 1, further comprising:
    detecting a second tap in said first direction of said mobile terminal using said tap sensitive sensor;
    determining a second user input, utilizing said second tap in said first direction; and
    as a response to said second user input, executing a second set of software code corresponding to said second user input.

8. The method according to claim 7, wherein said second set of software code comprises code for rendering a second exercise related measurement on said display.

9. The method according to claim 1, further comprising:
    when a threshold time has passed without user input, executing software code for putting said mobile communication terminal in an idle state.

10. The method according to claim 9, wherein said software code for putting said mobile communication terminal in an idle state comprises code for switching off illumination of said display.

11. A method for providing a user interface of an exercise application of a mobile communication terminal comprising a tap sensitive sensor and a display, said method comprising:
    detecting a first tap in a first direction of said mobile terminal using said tap sensitive sensor;
    determining a first user input, utilizing said first tap in said first direction, said first direction being, within a margin of error, perpendicular to said display;
    as a response to said first user input, executing a first set of software code corresponding to said first user input, said first set of software code comprising code for illuminating said display, for rendering a first exercise related measurement on said display and for generating synthetic voice sounds at least in part corresponding to at least part of said exercise related measurement;

detecting a second tap in said first direction of said mobile terminal using said tap sensitive sensor;

determining a second user input, utilizing said second tap in said first direction;

as a response to said second user input, executing a second set of software code corresponding to said second user input, said second set of software code comprising code for rendering a second exercise related measurement on said display; and when a threshold time has passed without user input, executing software code for putting said mobile communication terminal in an idle state, said software code for putting said mobile communication terminal in an idle state comprising code for switching off illumination of said display.

12. The method according to claim 11, wherein said first and second taps are sensed by a motion sensor.

13. The method according to claim 11, wherein said first and second taps are sensed by an accelerometer.

14. Apparatus comprising a controller and a tap sensitive sensor, wherein:

said controller is configured to detect a first tap in a first direction of said mobile terminal using said tap sensitive sensor;

said controller is configured to determine a first user input, utilizing said first tap in said first direction, wherein said first direction is, within a margin of error, perpendicular to a display; and said controller is configured to, as a response to said first user input, execute a first set of software code corresponding to said first user input and serving to control at least one display related aspect of said mobile communication terminal, and wherein said first set of software code at least comprises code for illuminating said display.

15. The apparatus according to claim 14, wherein said tap sensitive sensor comprises a motion sensor.

16. The apparatus according to claim 14, wherein said tap sensitive sensor comprises an accelerometer.

17. Apparatus according to claim 14 wherein the apparatus is mobile communication device.

18. A mobile communication terminal comprising:

a controller;

a tap sensitive sensor;

means for detecting a first tap in a first direction of said mobile terminal using said tap sensitive sensor;

means for determining a first user input, utilizing said first tap in said first direction, wherein said first direction is, within a margin of error, perpendicular to a display; and means for, as a response to said first user input, executing a first set of software code corresponding to said first user input and serving to control at least one display related aspect of said mobile communication terminal, and wherein said first set of software code at least comprises code for illuminating said display.

19. The mobile communication terminal according to claim 18, further comprising:

means for detecting a second tap in said first direction of said mobile terminal using said tap sensitive sensor;

means for determining a second user input, utilizing said second tap in said first direction; and means for, as a response to said second user input, executing a second set of software code corresponding to said second user input.

20. A mobile communication terminal comprising:

a controller;

a tap sensitive sensor;

means for detecting a first tap in a first direction of said mobile terminal using said tap sensitive sensor;

means for determining a first user input, utilizing said first tap in said first direction, said first direction being, within a margin of error, perpendicular to a display;

means for, as a response to said first user input, executing a first set of software code corresponding to said first user input, said first set of software code comprising code for illuminating said display, for rendering a first exercise related measurement on said display and for generating synthetic voice sounds at least in part corresponding to at least part of said exercise related measurement;

means for detecting a second tap in said first direction of said mobile terminal using tap sensitive sensor;

means for determining a second user input, utilizing said second tap in said first direction;

means for, as a response to said second user input, executing a second set of software code corresponding to said second user input, said second set of software code comprising code for rendering a second exercise related measurement on said display; and means for, when a threshold time has passed without user input, executing software code for putting said mobile communication terminal in an idle state comprising code for switching off illumination said display.

21. The mobile communication terminal according to claim 20, wherein said tap sensitive sensor comprises a motion sensor.

22. The mobile communication terminal according to claim 20, wherein said tap sensitive sensor comprises an accelerometer.

23. A computer program product comprising:

a processor usable medium having processor readable program code embodied therein for operating a display of a mobile communication terminal, the processor readable program code further comprising:

processor readable program code for causing a processor to detect a first tap in a first direction relative to said mobile terminal;

processor readable program code for causing a processor to determine a first user input, utilizing said first tap in said first direction, wherein said first direction is, within a margin of error from, perpendicular to said display; and processor readable program code for causing a processor to, in response to said first user input, illuminate said display.

24. The apparatus according to claim 23, further comprising:

processor readable program code for causing a processor to detect a second tap in said first direction of said mobile terminal using said tap sensitive sensor;

processor readable program code for causing a processor to determine a second user input, utilizing said second tap in said first direction; and processor readable program code for causing a processor to, as a response to said second user input, execute a second set of software code corresponding to said second user input.

* * * * *